(12) United States Patent
Sheppard et al.

(10) Patent No.: US 11,978,071 B2
(45) Date of Patent: May 7, 2024

(54) METHODS AND APPARATUS TO DETERMINE REACH WITH TIME DEPENDENT WEIGHTS

(71) Applicant: The Nielsen Company (US), LLC, New York, NY (US)

(72) Inventors: Michael Sheppard, Holland, MI (US); Ludo Daemen, Duffel (BE); Stephen S. Bell, McHenry, IL (US); Jonathan Sullivan, Hurricane, UT (US)

(73) Assignee: The Nielsen Company (US), LLC, New York, NY (US)

( * ) Notice: Subject to any disclaimer, the term of this patent is extended or adjusted under 35 U.S.C. 154(b) by 169 days.

(21) Appl. No.: 17/504,277

(22) Filed: Oct. 18, 2021

(65) Prior Publication Data
US 2022/0108336 A1   Apr. 7, 2022

Related U.S. Application Data

(63) Continuation of application No. 15/381,762, filed on Dec. 16, 2016, now Pat. No. 11,151,589.

(51) Int. Cl.
*G06Q 10/00* (2023.01)
*G06Q 30/0204* (2023.01)

(52) U.S. Cl.
CPC ............................... *G06Q 30/0204* (2013.01)

(58) Field of Classification Search
CPC ......... G06Q 30/0204; G06Q 10/06395; G06Q 10/00; G06Q 10/02; G06Q 10/06; G06Q 10/10; G06Q 30/02; G05B 2219/31357
See application file for complete search history.

(56) References Cited

U.S. PATENT DOCUMENTS

| 6,044,120 | A | 3/2000 | Bar-David et al. |
| 7,954,120 | B2 | 5/2011 | Roberts et al. |
| 8,805,865 | B2 | 8/2014 | Samari et al. |

(Continued)

OTHER PUBLICATIONS

Cohen, Steven, Reach, Frequency, and Impact: Utilizing Different Media Effectively, Apr. 20, 2021, Strategus, https://www.strategus.com/blog/reach-frequency-impact-utilize-different-media-effectively, p. 1-12. (Year: 2021).*

(Continued)

*Primary Examiner* — Joseph M Waesco

(57) ABSTRACT

Methods and apparatus to determine reach with time dependent weights are disclosed. An example method disclosed herein includes determining a first subset of panelists exposed to media at a first time; determining a second subset of the panelists exposed to the media at a second time; applying a first plurality of weights to the first subset of panelists to generate first weighted exposures; applying a second plurality of weights to the second subset of the panelists to generate second weighted exposures; for a first panelist in the first and second subsets, determining a first cumulative weighted exposure by determining which of the first and second weighted exposures is largest for each of the first panelist; for a second panelist in one of the first and second subsets, determining a second cumulative weighted exposure by based on the weight applied to the second panelist; and determining a reach of the media for the first and second times by combining the first and second cumulative weighted exposures.

18 Claims, 5 Drawing Sheets

(56) References Cited

U.S. PATENT DOCUMENTS

| | | | |
|---|---|---|---|
| 8,973,023 | B1 | 3/2015 | Rao et al. |
| 9,185,435 | B2 | 11/2015 | Shankar et al. |
| 11,151,589 | B2* | 10/2021 | Sheppard ............ G06Q 30/0204 |
| 2009/0030780 | A1 | 1/2009 | York et al. |
| 2009/0292587 | A1 | 11/2009 | Fitzgerald |
| 2010/0169158 | A1 | 7/2010 | Agarwal et al. |
| 2011/0288907 | A1* | 11/2011 | Harvey ............... G06Q 10/0639 |
| | | | 705/7.29 |
| 2012/0072940 | A1* | 3/2012 | Fuhrer ............. H04N 21/25891 |
| | | | 725/13 |
| 2013/0198125 | A1 | 8/2013 | Oliver et al. |
| 2013/0346154 | A1 | 12/2013 | Holz et al. |
| 2014/0164290 | A1 | 6/2014 | Salter |
| 2014/0180786 | A1* | 6/2014 | Sullivan .............. G06Q 30/0226 |
| | | | 705/14.27 |
| 2014/0180804 | A1 | 6/2014 | Jordan et al. |
| 2014/0278795 | A1 | 9/2014 | Satyamoorthy et al. |
| 2014/0278914 | A1 | 9/2014 | Gurumoorthy et al. |
| 2014/0278930 | A1 | 9/2014 | Brixius et al. |
| 2014/0310071 | A1* | 10/2014 | Conradson ....... G06Q 10/06375 |
| | | | 705/7.37 |
| 2014/0380349 | A1* | 12/2014 | Shankar ........... H04N 21/25883 |
| | | | 725/15 |
| 2014/0380350 | A1* | 12/2014 | Shankar ........... H04N 21/25883 |
| | | | 725/18 |
| 2015/0074515 | A1* | 3/2015 | Seeman ................. G06Q 10/00 |
| | | | 715/234 |
| 2015/0281775 | A1 | 10/2015 | Ramaswamy et al. |
| 2016/0086208 | A1 | 3/2016 | Oliver et al. |
| 2016/0125439 | A1 | 5/2016 | Sheppard et al. |
| 2016/0191970 | A1 | 6/2016 | Sheppard et al. |
| 2016/0323641 | A1 | 11/2016 | Holz et al. |
| 2016/0379235 | A1 | 12/2016 | Mendrisova et al. |
| 2017/0236135 | A1* | 8/2017 | Wood ................. G06Q 30/0204 |
| | | | 705/7.33 |
| 2017/0257681 | A1 | 9/2017 | McMillan |
| 2017/0352049 | A1* | 12/2017 | Tiwary ............... G06Q 20/4093 |
| 2018/0174171 | A1* | 6/2018 | Sheppard ........... G06Q 30/0204 |
| 2018/0249210 | A1* | 8/2018 | Sheppard ........... G06Q 30/0201 |
| 2018/0315060 | A1* | 11/2018 | Sheppard ........... G06Q 30/0203 |
| 2018/0357664 | A1 | 12/2018 | Nicholson et al. |
| 2019/0147461 | A1* | 5/2019 | Sheppard ........... G06Q 30/0201 |
| | | | 705/14.41 |
| 2019/0158921 | A1 | 5/2019 | Mowrer et al. |
| 2021/0133779 | A1* | 5/2021 | Adibi ................. G06Q 30/0201 |
| 2021/0133781 | A1* | 5/2021 | Adibi ................. G06Q 30/0254 |
| 2021/0133804 | A1* | 5/2021 | Adibi ............... G06Q 10/06312 |
| 2022/0108336 | A1* | 4/2022 | Sheppard ........... G06Q 30/0204 |

OTHER PUBLICATIONS

Andrew W. Mercer, Frauke Kreuter, Scott Keeter, Elizabeth A. Stuart, Theory and Practice in Nonprobability Surveys: Parallels between Causal Inference and Survey Inference, Public Opinion Quarterly, vol. 81, Issue S1, 2017, pp. 250-271, https://doi.org/10.1093/poq/nfw060. (Year: 2017).

Amorocho et al., "Time dependent weight functions for the Trajectory Piecewise-Linear approach," Institut Computational Mathematics, Technische Universitat Braunschweig, http://www.icm.tu-bs.de/.about.hfassben/papers/timedependent.pdf, 2011, 8 pages.

United States Patent and Trademark Office, "Non-Final Office Action," issued in connection with U.S. Appl. No. 15/381,762, dated Sep. 5, 2019, 26 pages.

United States Patent and Trademark Office, "Final Office Action," issued in connection with U.S. Appl. No. 15/381,762, dated Apr. 3, 2020, 28 pages.

United States Patent and Trademark Office, "Non-Final Office Action," issued in connection with U.S. Appl. No. 15/381,762, dated Aug. 6, 2020, 31 pages.

United States Patent and Trademark Office, "Notice of Allowance and Fee(s) Due," issued in connection with U.S. Appl. No. 15/381,762, dated Jun. 18, 2021, 9 pages.

\* cited by examiner

METHODS AND APPARATUS TO DETERMINE REACH WITH TIME DEPENDENT WEIGHTS

RELATED APPLICATION

This patent arises from a continuation of U.S. patent application Ser. No. 15/381,762, entitled "METHODS AND APPARATUS TO DETERMINE REACH WITH TIME DEPENDENT WEIGHTS," and filed on Dec. 16, 2016. Priority to U.S. patent application Ser. No. 15/381,762 is claimed. U.S. patent application Ser. No. 15/381,762 is incorporated herein by reference in its entirety.

FIELD OF THE DISCLOSURE

This disclosure related generally to audience measurement and, more particularly, to methods and apparatus to determine reach with time dependent weights.

BACKGROUND

Content providers and advertisers hire panelist to yield a representative sample of a desired demographic group of a population of users. Calibrating the representative sample is a technique used to improve estimates and reduce cost of having to construct a larger sample to achieve the same accuracy. In some examples, calibrating the represented sample includes weighting panelists to ensure that the panelists accurately represent a universe of users. In this manner, when a panelist is exposed to media, the exposure is credited based on the weight of the panelist. In such examples, the weights applied to each panelist may vary with time as the panel and/or universe varies.

BRIEF DESCRIPTION OF THE DRAWINGS

The figures are not to scale. Wherever possible, the same reference numbers will be used throughout the drawing(s) and accompanying written description to refer to the same or like parts

DETAILED DESCRIPTION

Figure 1:
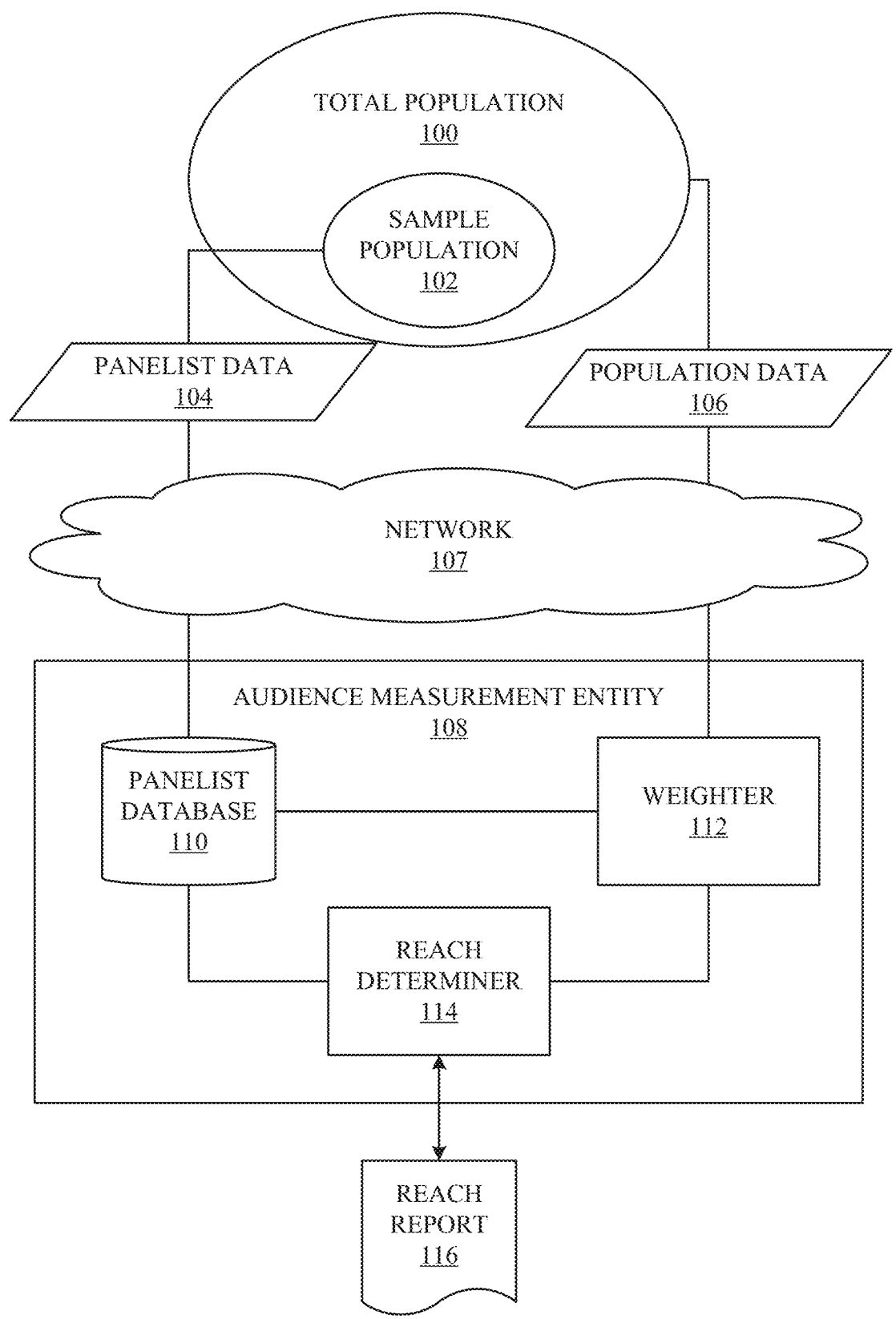
FIG. 1 is a block diagram of an example environment in which an example audience measurement entity obtains panelist data and population data from an example population to generate an example reach report.

Determining the size and specific demographics of a media viewing audience helps media content providers and distributors schedule media programming and determine a price for advertising during the programming. In addition, accurate estimates of media viewing demographics enable advertisers to target certain types and sizes of audiences. To collect these demographics, an audience measurement company enlists a plurality of media viewers (e.g., panelists) to cooperate in an audience measurement study (e.g., a panel) for a predefined length of time. The viewing habits and demographic data associated with the panelists are collected and used to statistically represent the total media viewing audience (e.g., a total population or universe). In some examples, weights are applied to each panelist such that the demographics of the weighted panelists match the demographics of the total population. In some examples, the audience measurement entity determines the total audience exposed to a particular media (e.g., television programs, radio programs, movies, DVDs, advertisements, streaming media, websites, television channels, radio channels, etc.) and/or the reach the reach of the particular media over a period of time based on the weighted panelists. As used herein, reach is a cumulative (e.g., cumulative over time) total unique audience. During a period of time when the reach may be determined, the weights associated with each panelist changes to adjust to a changing panel and/or universe. For example, at a first time there may be a first set of weights applied to each panelist in the panel; however, at a second time, additional panel members may have entered the panel changing the dynamics of the panel. As such, the audience measurement entity recalculates the weights at the second time so that the updated panel accurately represents the universe, thereby causing traditional calculation of reach (e.g., calculated based on one set of weights) to be inaccurate. Examples disclosed herein determine the reach of media with time dependent weights (e.g., weights changing over the period of time corresponding to the reach).

Examples disclosed herein generate a report identify reach over a period of time (e.g., a cumulative period of time) while the panelists' weights vary. The report may be based on user preferences identifying the parameters of the reach report (e.g., the media or type of media, the different cumulative times to analyze, a particular subset of the panelists to analyze, etc.). Examples disclosed herein include determining one or more subset of panelists that were exposed to media at various points in time and applying (e.g., multiplying) the varying weights to the subset(s) at the various points in time. In this manner, weighted exposures are determined based on the varying weights. Examples disclosed herein further include reclusively (e.g., by looking at the weights applied at the various points in time) identifying the largest weight applied to each of the panelists based on the cumulative time-frame of the reach report. The largest applied weights are summed to determine the reach of the media for the cumulative times. The reach cannot be more than the total universe. Accordingly, in some examples, when the reach is larger than the estimated universe total (e.g., the sum of the weights of the panelists), examples disclosed herein determine the reach to be estimated universe total.

An example method disclosed herein includes determining a first subset of panelists exposed to media at a first time. The example method further includes determining a second subset of the panelists exposed to the media at the second time. The example method further includes applying a first plurality of weights to the first subset of panelists to generate first weighted exposures. The example method further includes applying a second plurality of weights to the second subset of panelists to generate second weighted exposures. The example method further includes a first panelist in both the first and second subsets, determining a first cumulative weighted exposure by determining which of the first and second weighted exposures is largest for each of the first panelist. The example method further includes a second panelist not in both the first and second subsets, determining a second cumulative weighted exposure by based on the weight applied to the second panelist. The example method further includes determining a reach of the media for the first and second times by combining the first and second cumulative weighted exposures.

Turning to the figures, FIG. 1 illustrates an example environment in which a reach with time dependent weights is determined. FIG. 1 includes an example total population 100, an example sample population 102, example panelist data 104, example population data 106, an example network 107, an example audience measurement entity (e.g., AME) 108. The AME 108 includes an example panelist database 110, an example weighter 112, an example reach determiner 114, and an example reach report 116.

The example total population 100 is a total population of users (e.g., a universe or total audience) of a particular device or plurality of devices. For example, the total population 100 may be a total population of television viewers, computing device users, mobile device users, radio listeners, Internet users, video game users, and/or any population or combination of media users. Data, including demographic data, may be obtained and/or known for the example total population 100. The data from the example total population 100 is represented in the population data 106. The example population data 106 is transmitted to the example AME 108 via the example network 107. In some examples, population data may be obtained from a database proprietor that provides service to large numbers of subscribers. Such service may include, but is not limited to, cable television services, email services, social networking services, news media services, cloud storage services, streaming music services, streaming video services, satellite radio services, cellular services, video gaming services, online retail shopping services, credit monitoring services, etc. In some examples, the database proprietor maintains user account records corresponding to users registered for the media services provided by the database proprietors. The user account records may include demographic information (e.g., gender, age, income, location, education level, occupation, etc.). In some examples, however, media usage data may not be known for the total population 100. Alternatively, media usage data may not be released to the example AME 108. Additionally or alternatively, the population data 106 may come from any source (e.g., surveys, queries, etc.).

In order to determine the media usage behavior and/or complex demographics of the example total population 100, the example sample population 102 may be used. The example sample population 102 is a group (e.g., a panel) of monitored panelist within the total population 100. Data from the panelist may be acquired using local people meters, portable people meters, surveys, cookies, and/or any other means for obtaining data from a panelist. The data, including media usage data and detailed demographic data, of the example sample population 102 are represented in the example panelist data 104. The example panelist data 104 is transmitted via the example network 107 to the example AME 108 to be stored and calibrated (e.g., by applying weights) to represent the total population 100.

The example network 107 of FIG. 1 is a communications network. The example network 107 allows the example panelist data 104 and/or the example population data 106 to be accessed by the example the example AME 108. The example network 107 may be a local area network, a wide area network, the Internet, a cloud, or any other type of communications network.

In the illustrated example, the AME 108 does not provide the media to the total population 100 and is a trusted (e.g., neutral) third party (e.g., The Nielsen Company, LLC) for providing accurate media access (e.g., exposure) statistics. The AME 108 establishes a panel of users (e.g., the example sample population 102) who have agreed to provide their demographic information and to have their media exposure activities monitored. When an individual joins the sample population 102 (e.g., a panel), the individual (e.g., panelist) provides detailed information concerning the person's identity and demographics (e.g., gender, age, ethnicity, income, home location, occupation, etc.) to the AME 108.

The example panelist database 110 of the example AME 108 of FIG. 1 stores and aggregates the example panelist data 104. The example panelist database 110 includes demographic data corresponding to each panelist in the example panel (e.g., the example sample population 102). Additionally, the example panelist database 110 tracks the media exposure of the panelists. For example, the panelist database 110 may store indications related to media exposures for each panelist at various points in time. In such an example, the stored panelist data in the example panelist database 110 may be used to determine that a first panelist was exposed to (A) a first media at a first and third time and (B) a second media at the first time and a second time. Additionally, the panelist database 110 may store indications of active and/or inactive panelists. For example, if a panelist is inactive, the panelist database 110 may store an inactive indication for the panelist along with the time period in which the panelist is inactive. In this manner, the example weighter 112 can weigh the other panelists based on active panelists (e.g., to better represent the example total population 100).

The example weighter 112 receives the example population data 106 and the panelist data from the example panelist database 110 and generates weights for panelists so that the panelist accurately represents the example total population 100. In some examples, the weighter 112 receives reach report settings from the example reach determiner 114 and generates the weights for the panelists at different points in time based on the reach report settings. For example, if the reach report settings correspond to a reach report of reach of a television channel at three points in time for female panelists. The example weighter 112 determines the appropriate weights for the female panelists from the example panelist database 110 at the three points in time so that, at each point in time, the female panelists accurately represent the total population of female users.

The example reach determiner 114 generates the example reach report 116 based on panelists with time-dependent weights. The example reach report 116 includes a reach of media at different points in time. As described above, the reach is an estimate of the cumulative total unique audience at various points in time (e.g., the various points in time corresponding to different sets of weights). In some examples, the example reach determiner 114 includes a user interface to receive reach report settings. The reach report settings customize the example reach report 116 based on the desired points in time, the desired media, and a desired subset of the panelists analyzed. For example, the reach report 116 may identify the reach of all panelists for a television show (e.g., the Walking Dead) based on a first, second, and third time. In such an example, the reach determiner 114 gathers panelist data stored in the example panelist database 110 to identify which panelists were exposed to the Walking Dead at the first, second, and/or third times. Additionally, the example reach determiner 114 gathers the weights of the panelists at the first, second, and third times from the example weighter 112. The example reach determiner 114 generates the example reach report 116 by determining the reach and/or the unique audience at each of the three times based on the panelist data and the weights, as further described in conjunction with FIGS. 2 and 3.

Figure 2:
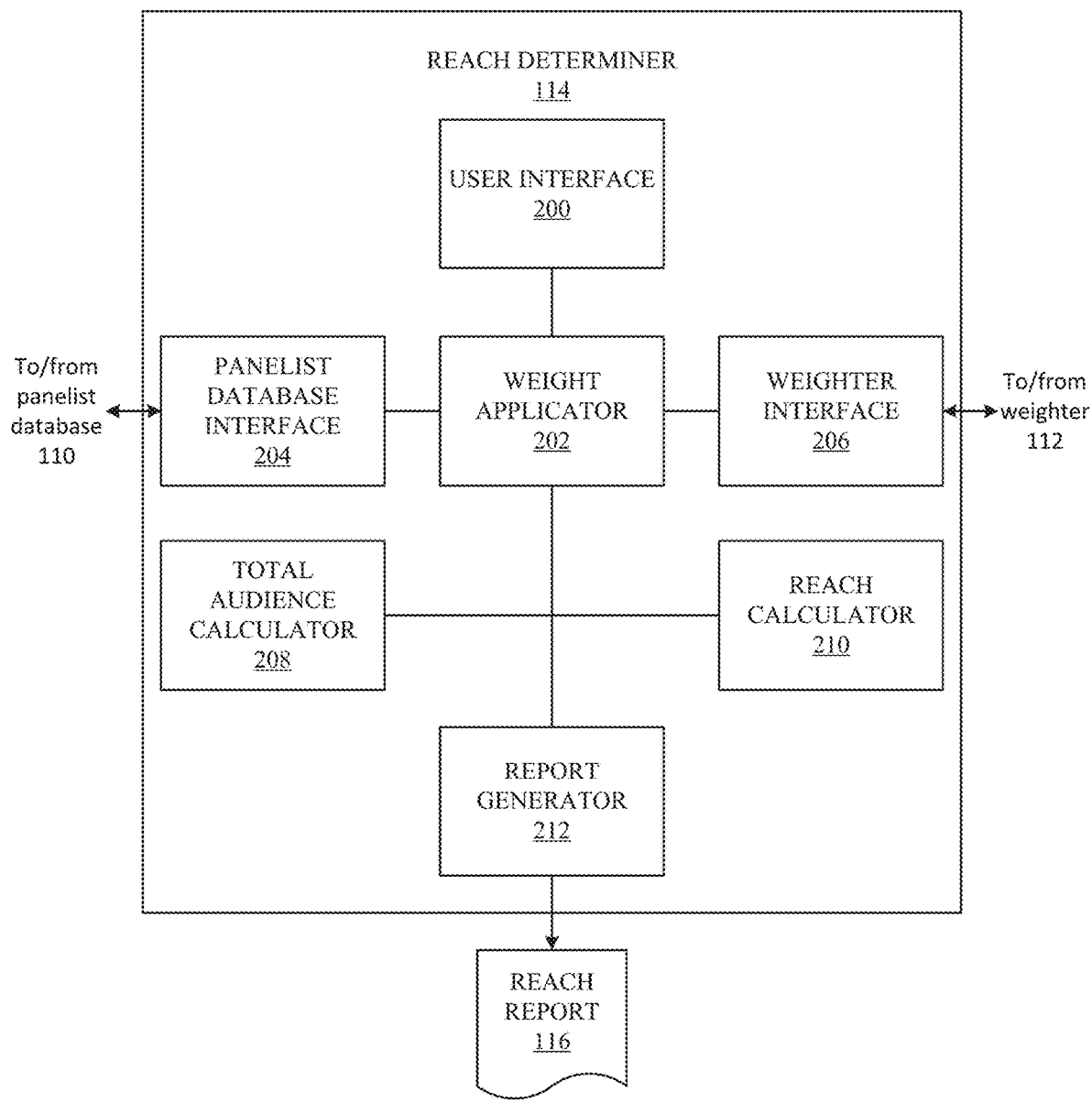
FIG. 2 is a block diagram of an example implementation of an example reach determiner of FIG. 1.

FIG. 2 is a block diagram of the example reach determiner 114 of FIG. 1, disclosed herein, to generate the example reach report 116 by determining the reach of media with time dependent weights. The example reach determiner 114 includes an example user interface 200, an example weight applicator 202, an example panelist database interface 204, an example weighter interface 206, an example total audience calculator 208, an example reach calculator 210, and an example report generator 212.

The example user interface 200 interfaces with a user to receive the reach settings (e.g., the parameters for the example reach report 116). Because the reach is a cumulative unique audience for media, the reach settings include various times which correspond to the desired reach. For example, a user may desire a cumulative reach for media at each day within a week. In such an example, the reach corresponds to the cumulative unique audience for the media during each day of the entire week. In this manner, a panelist who is exposed to the media for multiple days counts toward the reach without overlap. Thus, the reach represents all the users that were exposed to the media within the week period.

The example weight applicator 202 gathers panelist data from the example panelist database 110 via the example panelist database interface 204 based on the reach settings received by the example user interface 200 (e.g., including but not limited to data related to exposure to the media identified in the reach settings). Additionally, the example weight applicator 202 gathers weights from the example weighter 112 via the example weighter interface 206 corresponding to the panelists at the points in time identified in the reach settings. In some examples, the panelist database interface 204 and the example weighter interface 206 is the same interface. Additionally, the example weight applicator 202 applies the gathered weights to the example panelists at the points in time identified in the reach settings.

The example total audience calculator 208 calculates a total audience for media at one or more points in time by determining weighted exposures to the media based on the weighted panelists exposed to the media. In some examples, the total audience calculator 208 computes a weighted exposure matrix (e.g., the example weighted exposure matrix 408 of FIG. 4) including all the weighted exposures of the panelists at the one or more points in time. The example total audience calculator 208 generates the weighted exposures by applying the time dependent weights to the panelists. In some examples, the total audience calculator 208 applies a '1' to a panelist who was exposed to the media at a point in time identified by the reach settings and a '0' to a panelist who was not exposed to the media at a point in time identified by the reach settings, where the '1' and the '0' are indicators (e.g., indicating whether the panelist was exposed to the media at the time). In such examples, the total audience calculator 208 applies (e.g., multiplies) the weights by the indicators to generate the weighted exposures. Alternatively, the example total audience calculator 208 may determine the weighted exposures for the media at the one or more points in time by only apply the weights to the subsets of panelists who were exposed to the media at the one or more points in time. In this manner, the example total audience calculator 208 only applies the weights to the subset of panelists that are exposed to the media. In some examples, the example total audience calculator 208 identifies a weighted exposure total (e.g., representative of the total audience exposed to the media) for each of the one or more points in time by summing the weighted exposures of each panelist for a given point in time.

The example reach calculator 210 calculates the cumulative reach for cumulative points in time based on the weighted exposures calculated by the example total audience calculator 208 and the reach settings. The example reach calculator 210 determines the largest (e.g., numerically) weighted exposure at the points in time for each panelist within the cumulative times, thereby generating cumulative weighted exposures for each panelist. For example, for an hourly cumulative reach for media during a 24 hour period, a first panelist may have been exposed to the media at only the $1^{st}$ and $23^{rd}$ hour, where the weight for the first panelist at the $1^{st}$ hour is 15 and the weight for the $23^{rd}$ hour is 145, the example reach calculator 210 determines that the cumulative weighted exposure for the first panelist to be 145 (e.g., Max (15, 145), where max(a,b) outputs the maximum value between a and b). If a second panelist was exposed to the media at the $2^{nd}$, $3^{rd}$, $10^{th}$, and $20^{th}$ hour, where the corresponding weights are 150, 10, 132, and 75, the example reach calculator 210 determines that the cumulative weighted exposure for the second panelist to be 150 (e.g., Max (150, 10, 132, 75)) during the 24-hour period. Alternatively, the reach may be calculated based on any time period or subset of times (e.g., a daily reach in a week period, a $3^{rd}$, $4^{th}$, and $20^{th}$ hour reach of a 24-hour period, etc.). If a third panelist is not exposed to the media at any point within the 24-hour period, the example reach calculator 210 determines the cumulative weighted exposure to be 0. If a fourth panelist is only exposed to the media at the $5^{th}$ hour, the example reach calculator 210 determines that the cumulative weighted exposure to be whatever weight is applied at the $5^{th}$ hour (e.g., 87, for example).

Once the cumulative weighted exposures are determined for each panelist based on the reach settings, the example reach calculator 210 of FIG. 2 identifies the reach of the media by summing the cumulative weighted time of each panelist. Using the above example, the example reach calculator 210 determines the reach to be 382 (e.g., 145 for the first panelist+150 for the second panelist+0 for the third panelist+87 for the fourth panelist=382). In some examples, the sum of the cumulative weighted exposures may be more than the weight total (e.g., representative of the universe, which is based on the sum of all the weights at each point in time) of the panelists. The reach cannot be larger than the universe of users. Accordingly, in such examples, the reach calculator 210 determines the reach to be the weight total. In some examples, the reach calculator 210 determines the reach and adjusts the reach to satisfy the universe totals (e.g., the sum of the weights). An example of a calculation of the reach is described in conjunction with FIG. 3. Once the example reach calculator 210 calculates the reach, the example report generator 212 generates the example reach report 116. The example report generator 212 may include any additional data related to the reach as defined by the reach settings. For example, the reach report 116 may include demographics corresponding to the reach based on the demographics of the panelist exposure to the media.

While example manners of implementing the example reach determiner 114 of FIG. 1 are illustrated in FIG. 2, elements, processes and/or devices illustrated in FIG. 2 may be combined, divided, re-arranged, omitted, eliminated and/or implemented in any other way. Further, the example user interface 200, the example weight applicator 202, the example panelist database interface 204, the example weighter interface 206, the example total audience calculator 208, the example reach calculator 210, the example report generator 212, and/or, more generally, the example reach determiner 114 of FIG. 2 may be implemented by hardware, machine readable instructions, software, firmware and/or any combination of hardware, machine readable instructions, software and/or firmware. Thus, for example, any of the example user interface 200, the example weight applicator 202, the example panelist database interface 204, the example weighter interface 206, the example total audience calculator 208, the example reach calculator 210, the example report generator 212, and/or, more generally, the example reach determiner 114 of FIG. 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 200, the example weight applicator 202, the example panelist database interface 204, the example weighter interface 206, the example total audience calculator 208, the example reach calculator 210, the example report generator 212, and/or, more generally, the example reach determiner 114 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example reach determiner 114 of FIG. 2 include elements, processes and/or devices in addition to, or instead of, those illustrated in FIG. 3, and/or may include more than one of any or all of the illustrated elements, processes and devices.

Figure 3:
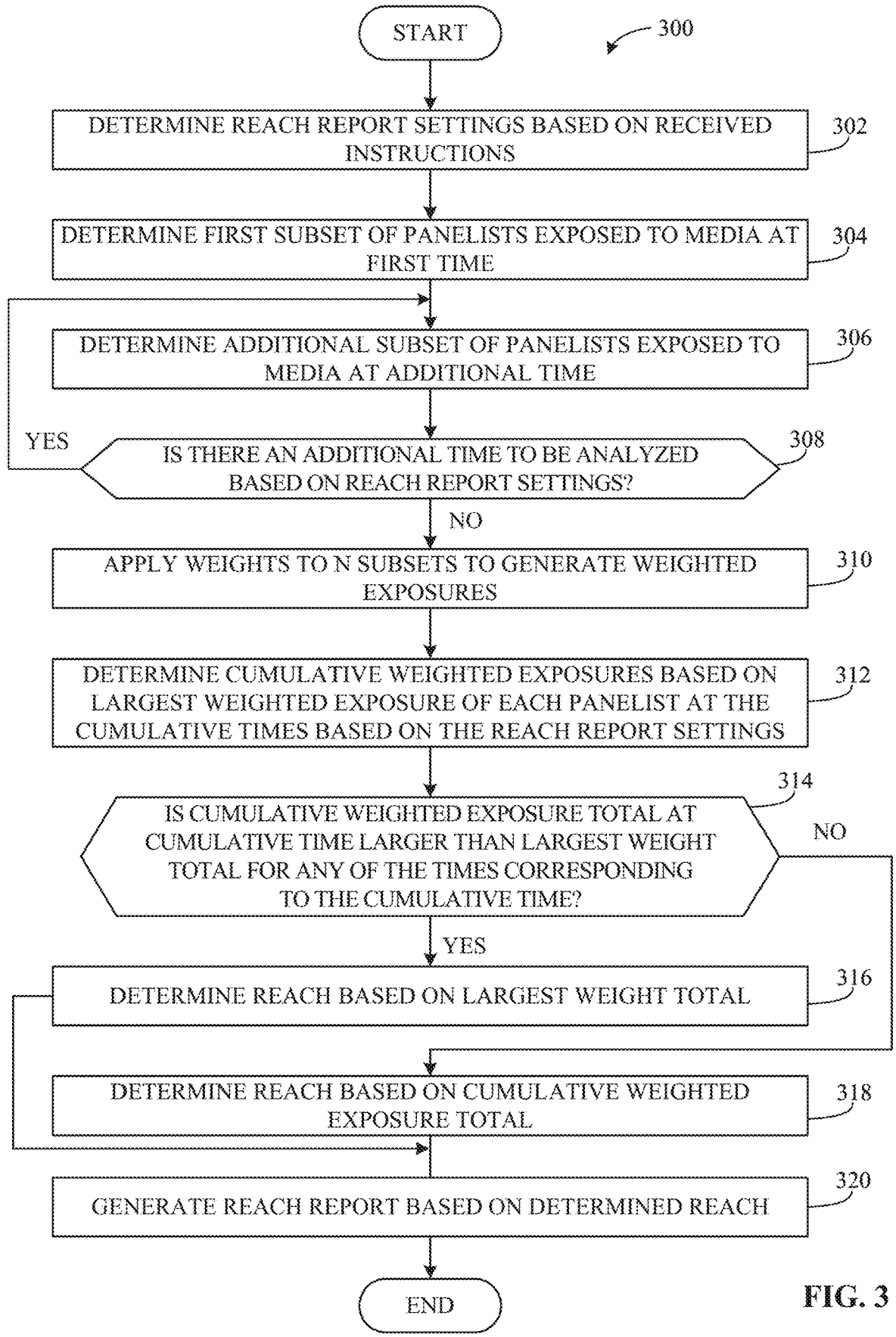
FIG. 3 is a flowchart representative of example machine readable instructions that may be executed to implement the example reach determiner of FIG. 1 and/or FIG. 2.

Flowcharts representative of example machine readable instructions for implementing the example reach determiner 114 of FIG. 2 are shown in FIG. 3. In the examples, the machine readable instructions comprise a program for execution by a processor such as the processor 512 shown in the example processor platform 500 discussed below in connection with FIG. 5. The program may be embodied in machine readable instructions stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example reach determiner 114 of FIG. 2 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example machine readable instructions illustrated in FIG. 3 may be executed to cause the reach determiner 114 of FIG. 2 to determine reach with time dependent weights. Although the flowchart of FIG. 3 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

Figure 4:
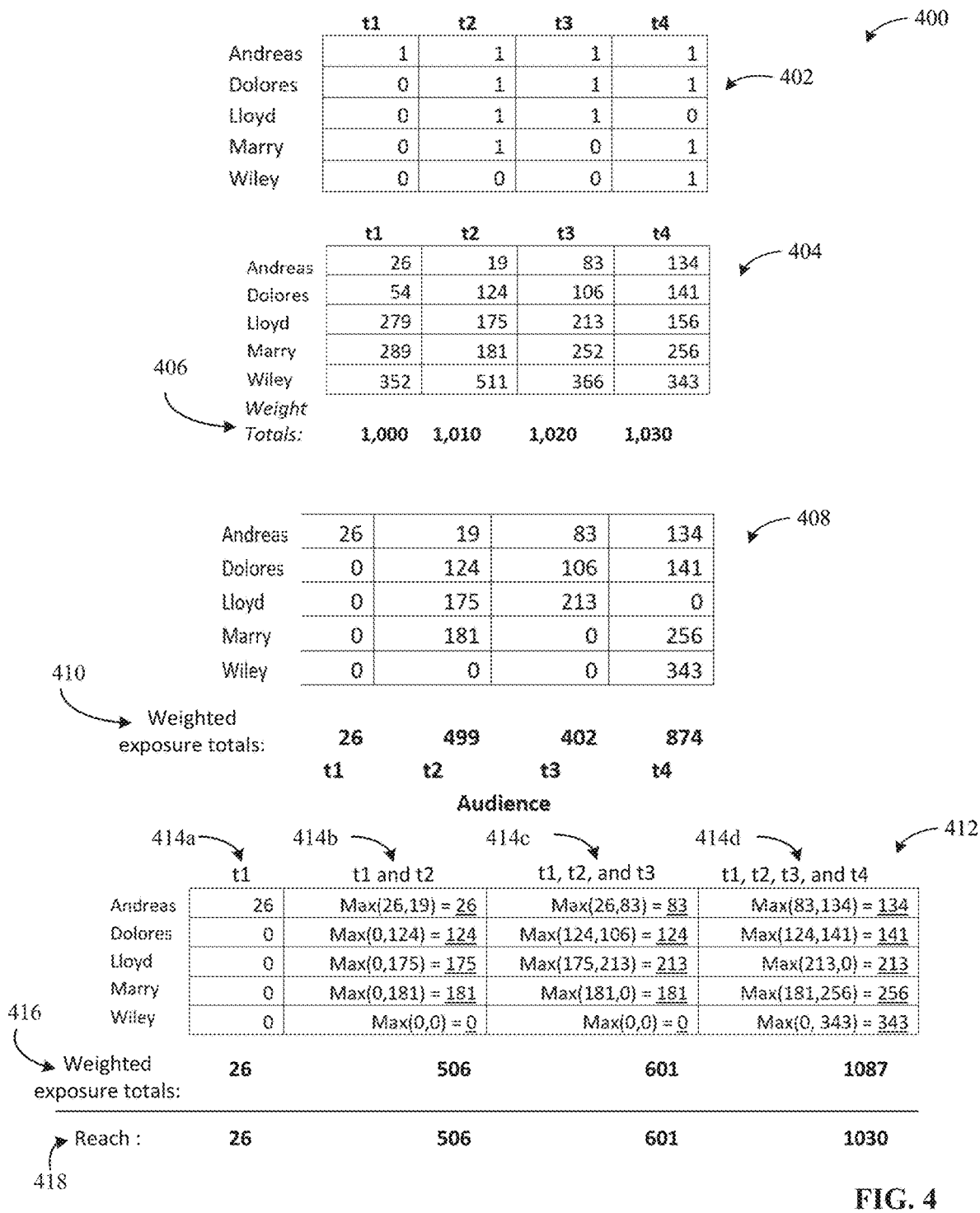
FIG. 4 illustrates data from an example panel used to generate the example reach report of FIG. 1.

FIG. 3 is an example flowchart 300 representative of example machine readable instructions that may be executed to implement the reach determiner 114 of FIG. 2 to reach of media with time dependent weights. The example flowchart 300 of FIG. 3 is described in conjunction with the example data 400 of FIG. 4. The example data 400 includes an example indicator matrix 402, an example time dependent weight matrix 404, example weight totals 406, an example weighted exposure matrix 408, example weighted exposure totals 410, an example cumulative weighted exposure matrix 412, example cumulative times 414a-d, example cumulative weighted exposure totals 416, and example reach 418. The example data 400 is based on exposure to media (e.g., a television program) at four different times for a panel of five panelists. Alternatively, reach may be calculated based on any number of panelists at any number of times. Although the example data 400 of FIG. 4 is organized in matrices, the example data 400 can be organized in any manner.

At block 302, the example weight applicator 202 determines reach report settings based on received instructions (e.g., received by the example user interface 200). As described above, the reach report settings identify the parameters for generating the example reach report 116 of FIGS. 1 and 2. In the illustrated example of FIG. 4, the reach report includes a cumulative reach at a first time (t1), a second time (t2), a third time (t3), and a fourth time (t4). Alternatively, the reach report settings could include a cumulative reach at any number of times (e.g., t1 and t2; t1, t3, and t4; etc.).

At block 304, the example total audience calculator 208 determines a first subset of panelists exposed to the media (e.g., the television program) at a first time (t1). The example total audience calculator 208 receives the exposure data via the example panelist database interface 204. As illustrated in the example indicator matrix 402, panelist Andreas is included in the first subset of panelists exposed to the media at t1 (e.g., represented by the value '1'). At block 306, the example total audience calculator 208 determines an additional (e.g., second) subset of panelists exposed to the media at an additional time (e.g., t2). As illustrated in the example indicator matrix 402, panelists Andreas, Dolores, Lloyd, and Marry are included in the second subset of panelists exposed to the media at time t2.

At block 308, the example total audience calculator 208 determines if there is an additional time to be analyzed based on the reach report settings. If the example total audience calculator 208 determines that there is an additional time to be analyzed (block 308: YES), the example total audience calculator 208 continues to determine additional subsets at the additional times until the times corresponding to the reach report settings have all been analyzed. For example, in the illustrated example of FIG. 4, the reach report settings correspond to a reach report of the media for four times. Accordingly, the example total audience calculator determines a third subset of panelists exposed to the media at time t3 (e.g., panelists Andreas, Dolores, and Lloyd) and a fourth subset of panelists exposed to the media at time t4 (e.g., panelists Andreas, Dolores, Marry, and Wiley).

If the example total audience calculator 208 determines that there is not an additional time to be analyzed (block 308: NO), the example weight applicator 202 applies weights (e.g., time dependent weights) to the N (e.g., 4) subsets to generate weighted exposures (block 310). In the illustrated example of FIG. 4, the total audience calculator 208 applies the example indicator matrix 402 to the example time dependent weight matrix (e.g., by performing an element wise multiplication) to generate the example weighted exposure matrix 408. Alternatively, the example total audience calculator 208 may apply the corresponding weights (e.g., corresponding to the example time dependent weight matrix 404) to the subsets (e.g., without applying the weights to panelists who have not been exposed to the media, defined by the '0' values). For example, the example total audience calculator 208 may apply the '26' weight to Andreas for the time t1 subset, the '19' weight to Andreas, the '124' weight to Dolores, the '175' weight to Lloyd, and the '181' weight to Marry for the t2 subset, etc. In some examples, the total audience calculator 208 determines the total audience for the media at each time by computing the example weighted exposure totals 410 at each time. The example total audience calculator 208 computes the weighted exposure totals 410 by summing the weighted exposures across all panelists exposed to the media at the identified time. For example, the weighted exposure total 410 (e.g., the total audience) at time t3 is 402 (e.g., 83+106+213).

At block 312, the example reach calculator 210 determines cumulative weighted exposures based on the largest weighted exposure of each panelist at the cumulative times (e.g., t1, t2, t3, and t4) based on the reach report settings. In some examples, such as when the panelist is only in one subset (e.g., Wiley), the largest weighted exposure for the panelist at the cumulative times is the only applied weight (e.g., 343). In some examples, such as when the panelist is in multiple subsets, the largest weighted exposure for the panelist is the largest applied weight at any of the times (e.g., t1, t2, t3, and t4) identified in the reach report settings. If a panelist is not in any subset (e.g., was not exposed to the media at any of times identified in the reach report settings), the example reach calculator 210 applies a '0' or doesn't apply any data.

In the illustrated example of FIG. 4, the example reach calculator 210 generates the cumulative weighted exposure matrix 412 based on a recursive model that looks at the previously applied weights for each panelist to identify the largest applied weight at different cumulative times 414a-d.

For example, looking at cumulative weights for panelist Andreas, the first cumulative time 414a is not cumulative with any other time (e.g., only included time t1). Accordingly, the example reach calculator 210 determines that the weighted exposure applied to Andreas at time t1 (e.g., '26') is the cumulative weighted exposure (e.g., '26'). At the second cumulative time 414b, the example reach calculator 210 determines that the cumulative weight exposure for times t1 and t2 is 26 (e.g., Max (26, 19), where Max (a,b) outputs the maximum value between a and b, 26 is the weight applied at time t1 and 19 is the weight applied at time t2), at the third cumulative time 414c, the example reach calculator 210 determines that the cumulative weight exposure for times t1, t2, and t3 is 83 (e.g., Max (26, 19, 83) or Max (26, 83), where 26 is maximum weight applied between t1 and t2 (e.g., Max (26,19)) and 83 is the weight applied at time t3), etc.

At block 314, the example reach calculator 210 determines if the cumulative weighted exposure total at the cumulative time (e.g., one of the example cumulative weighted exposure totals 416) is larger than the largest weight total at any of the times corresponding to the cumulative time (e.g., any one of the example weight totals 406). The example reach calculator 210 determines the cumulative weighted exposure total at the cumulative time by summing the cumulative weighted exposures at the cumulative time. For example, the example cumulative weighed exposure total 416 for the example "t1, t2, t3, and t4" cumulative time 414d is 1,087 (e.g., 134+141+213+256+343) and the largest of the example weight totals 406 is 1,030 (e.g., Max (1000, 1010, 1020, 1030)). Accordingly, the cumulative weighted exposure total 416 for the example cumulative time 414d is larger than the largest of the example weight totals 406. The example reach 418 cannot be larger than the universe of users. Accordingly, the cumulative weighted exposure total corresponding to N times cannot be larger than the largest universe total of the N times.

If the example reach calculator 210 determines that the cumulative weighted exposure total at the cumulative time is larger than the largest weight total at any of the times corresponding to the cumulative time (block 316: YES), the example reach calculator 210 determines the example reach 418 based on the largest weight total (block 316). For example, for the reach corresponding to time t1, t2, t3, and t4, the example reach calculator 210 determines the example reach 418 to be 1,030, because the example cumulative weighted exposure total of the t1-t4 cumulative time 414d is 1,087 which is larger than the largest weight total of 1,030. Alternatively, the example reach calculator 210 may calculate the reach to be 1,087 and adjust (e.g., reduce) the reach so that the reach is less than or equal to the largest weight total of 1,030.

If the example reach calculator 210 determines that the cumulative weighted exposure total at the cumulative time is not larger than the largest weight total at any of the times corresponding to the cumulative time (block 316: NO), the example reach calculator 210 determines the example reach 418 based on the cumulative weighted exposure total (block 318). For example, for the example reach 418 corresponding to time t1, t2, and t3, the example reach calculator 210 determines example the reach 418 to be 601, because the example cumulative weighted exposure total of the t1-t3 cumulative time 414c is 601 (e.g., 83+124+213+181) which is not larger than the largest weight total of 1,020 (e.g., Max (1000, 1010, 1020)). At block 320, the example report generator 212 generates the example reach report 116 based on the determined example reach 418.

Figure 5:
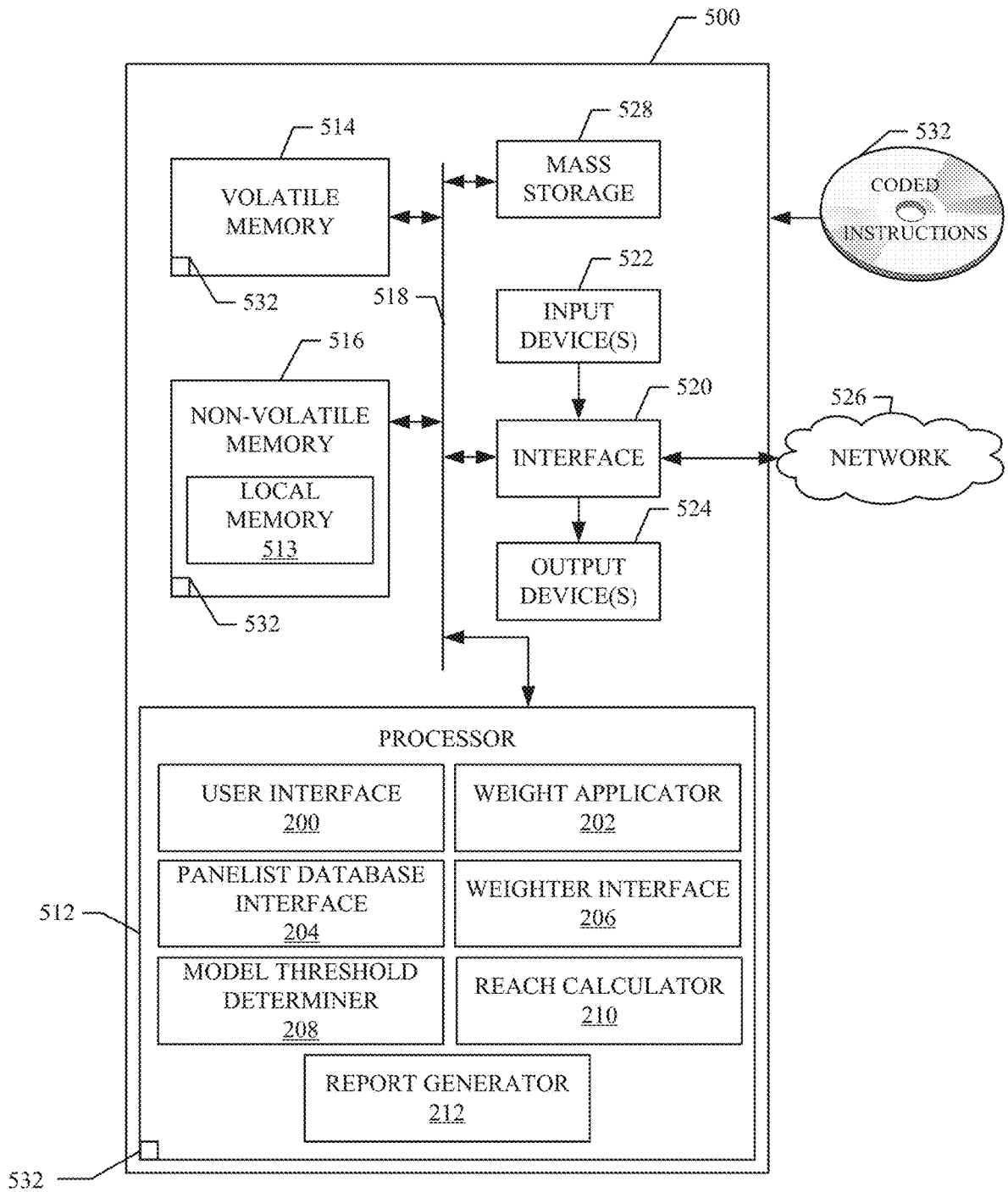
FIG. 5 is a block diagram of an example processor platform that may be utilized to execute the example instructions of FIG. 3 to implement the example reach determiner of FIG. 1 and/or FIG. 2.

FIG. 5 is a block diagram of an example processor platform 500 capable of executing the instructions of FIG. 3 to implement the example memory controller 202 of FIG. 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by integrated circuits, logic circuits, microprocessors or controllers from any desired family or manufacturer.

The processor 512 of the illustrated example includes the example memory 513 (e.g., a cache). The example processor 512 of FIG. 5 executes the instructions of FIG. 3 to implement the example user interface 200, the example weight applicator 202, the example panelist database interface 204, the example weighter interface 206, the example total audience calculator 208, the example reach calculator 210, and the example report generator 212 of FIG. 2 to implement the example reach determiner 114. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 3 may be stored in the mass storage device 528, in the volatile memory 514, in the non-volatile memory 516, and/or on a removable tangible computer readable storage medium such as a CD or DVD.

From the foregoing, it would be appreciated that the above disclosed methods, apparatus, and articles of manufacture determine reach with time dependent weights. Panels are constantly changing to include additional panelists or remove panelists. Additionally, panels change due to panelist inactivity and/or meter equipment malfunction. Accordingly, weights applied to a panel at one point in time to accurately correspond to a universe of users may be inaccurate at a second point in time. Thus, weights are updated at different points in time so that weighting the panel accurately corresponds to the universe of users. However, when the weights change (e.g., become time dependent), conventional techniques of determining reach based on a panel become obsolete, as such conventional techniques depend on weights being constant. Examples disclosed herein accurately determine reach of media for different weights at different times. Accordingly, examples disclosed herein more accurately determine reach with time dependent weights then conventional methods.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
at least one memory storing computer-readable instructions;
at least one processor to execute the computer-readable instructions to:
access, from a communications network, a first plurality of exposures of a first audience to media at a first time;
generate first weighted exposures based on a first plurality of weights and the first plurality of exposures of the first audience to the media at a first time, the first plurality of weights generated based on the first audience to the media at the first time;
access, from the communications network, a second plurality of exposures of a second audience to the media at a second time different than the first time;
generate second weighted exposures based on a second plurality of weights and the second plurality of exposures of the second audience to the media at the second time, the second plurality of weights calculated as an updated version of the first plurality of weights based on the second audience to the media at the second time being different than the first audience to the media at the first time;
determine a first cumulative weighted exposure based on a first value corresponding to a larger one of (a) a first one of the first weighted exposures corresponding to a first audience member and the first time and (b) a first one of the second weighted exposures corresponding to the first audience member and the second time, the first audience member in both the first and second audiences;
determine a second cumulative weighted exposure based on a second value corresponding to a larger one of (a) a second one of the first weighted exposures corresponding to a second audience member and the first time and (b) a second one of the second weighted exposures corresponding to the second audience member and the second time, the second audience member in both the first and second audiences; and combine the first and second cumulative weighted exposures to determine a reach of audience members exposed to the media for the first and second times, respectively; and based on determining that 1) the reach of the audience members exposed to the media for the first time is larger than sum of the first plurality of weights at the first time or that 2) the reach of the audience members exposed to the media for the second time is larger than the sum of the second plurality of weights at the second time, adjust, respectively, 1) the reach of the audience members exposed to the media for the first time to be less than or equal to the sum of the first plurality of weights for the first time or 2) the reach of the audience members exposed to the media for the second time to be less than or equal to the sum of the second plurality of weights for the second time.

2. The apparatus of claim 1, wherein:

the first plurality of weights includes a first weight for the first person and a second weight for the second person, the first plurality of weights corresponding to a total population at the first time; and the second plurality of weights includes a third weight for the first person and a fourth weight for the second person, the second plurality of weights corresponding to the total population at the second time.

3. The apparatus of claim 2, wherein the first plurality of weights are time-dependent weights corresponding to whether the first audience was exposed to the media at the first time.

4. The apparatus of claim 1, wherein the processor circuitry is to:

sum the first weighted exposures to determine a first unique audience total corresponding to the first time; and sum the second weighted exposures to determine a second unique audience total corresponding to the second time.

5. The apparatus of claim 1, wherein the processor is to set a third cumulative weighted exposure to zero, the third cumulative weighted exposure for a third person not in either of the first audience or the second audience.

6. The apparatus of claim 1, wherein the processor is to sum the first cumulative weighted exposure and the second cumulative weighted exposure to combine the first and second cumulative weighted exposures.

7. The apparatus of claim 1, wherein the processor is to:

sum the first plurality of weights to determine a first total audience corresponding to the first time; and sum the second plurality of weights to determine a second total audience corresponding to the second time.

8. An apparatus comprising:

means for generating weighted exposures, the means for generating the weighted exposures to:

access, from a communications network, a first plurality of exposures of a first audience to media at a first time;

generate first weighted exposures based on a first plurality of weights and the first plurality of exposures of the first audience to the media at a first time, the first plurality of weights generated based on the first audience to the media at the first time;

access, from the communications network, a second plurality of exposures of a second audience to the media at a second time different than the first time;

generate second weighted exposures based on a second plurality of weights and the second plurality of exposures of the second audience to the media at the second time, the second plurality of weights calculated as an updated version of the first plurality of weights based on the second audience to the media at the second time being different than the first audience to the media at the first time;

means for determining cumulative weighted exposures, the means for determining the cumulative weighted exposures to:

determine a first cumulative weighted exposure based on a first value corresponding to a larger one of (a) a first one of the first weighted exposures corresponding to a first audience member and the first time and (b) a first one of the second weighted exposures corresponding to the first audience member and the second time, the first audience member in both the first and second audiences; and determine a second cumulative weighted exposure based on a second value corresponding to a larger one of (a) a second one of the first weighted exposures corresponding to a second audience member and the first time and (b) a second one of the second weighted exposures corresponding to the second audience member and the second time, the second audience member in both the first and second audiences; and means for combining the first and second cumulative weighted exposures to determine a reach of people exposed to the media for the first and second times respectively; and based on determining that 1) the reach of the people exposed to the media for the first time is larger than sum of the first plurality of weights at the first time or that 2) the reach of the people exposed to the media for the second time is larger than the sum of the second plurality of weights at the second time, adjust, respectively, 1) the reach of the people exposed to the media for the first time to be less than or equal to the sum of the first plurality of weights for the first time or 2) the reach of the people exposed to the media for the second time to be less than or equal to the sum of the second plurality of weights for the second time.

9. The apparatus of claim 8, wherein:

the first plurality of weights includes a first weight for the first person and a second weight for the second person, the first plurality of weights corresponding to a total population at the first time; and the second plurality of weights includes a third weight for the first person and a fourth weight for the second person, the second plurality of weights corresponding to the total population at the second time.

10. The apparatus of claim 9, wherein the first plurality of weights are time-dependent weights corresponding to whether the first audience was exposed to the media at the first time.

11. The apparatus of claim 8, wherein the means for determining the cumulative weighted exposures is to:
sum the first weighted exposures to determine a first unique audience total corresponding to the first time; and
sum the second weighted exposures to determine a second unique audience total corresponding to the second time.

12. The apparatus of claim 8, wherein the means for determining the cumulative weighted exposures is to set a third cumulative weighted exposure to zero, the third cumulative weighted exposure for a third person not in either of the first audience or the second audience.

13. The apparatus of claim 8, wherein the means for combining the first and second cumulative weighted exposures is to sum the first cumulative weighted exposure and the second cumulative weighted exposure to combine the first and second cumulative weighted exposures.

14. The apparatus of claim 8, wherein the means for determining the cumulative weighted exposures is to:
sum the first plurality of weights to determine a first total audience corresponding to the first time; and
sum the second plurality of weights to determine a second total corresponding to at the second time.

15. At least one non-transitory computer readable medium comprising instructions that, when executed, cause one or more processors to at least:
access, from a communications network, a first plurality of exposures of a first audience to media at a first time;
generate first weighted exposures based on a first plurality of weights and the first plurality of exposures of the first audience to the media at a first time, the first plurality of weights generated based on the first audience to the media at the first time;
access, from the communications network, a second plurality of exposures of a second audience to the media at a second time different than the first time;
generate second weighted exposures based on a second plurality of weights and the second plurality of exposures of the second audience to the media at the second time, the second plurality of weights calculated as an updated version of the first plurality of weights based on the second audience to the media at the second time being different than the first audience to the media at the first time;
determine a first cumulative weighted exposure based on a first value corresponding to a larger one of (a) a first one of the first weighted exposures corresponding to a first audience member and the first time and (b) a first one of the second weighted exposures corresponding to the first audience member and the second time, the first audience member in both the first and second audiences;
determine a second cumulative weighted exposure based on a second value corresponding to a larger one of (a) a second one of the first weighted exposures corresponding to a second audience member and the first time and (b) a second one of the second weighted exposures corresponding to the second audience member and the second time, the second audience member in both the first and second audiences; and
combine the first and second cumulative weighted exposures to determine a reach of audience members exposed to the media for the first and second times, respectively; and
based on determining that 1) the reach of the audience members exposed to the media for the first time is larger than sum of the first plurality of weights at the first time or that 2) the reach of the audience members exposed to the media for the second time is larger than the sum of the second plurality of weights at the second time,
adjust, respectively, 1) the reach of the audience members exposed to the media for the first time to be less than or equal to the sum of the first plurality of weights for the first time or 2) the reach of the audience members exposed to the media for the second time to be less than or equal to the sum of the second plurality of weights for the second time.

16. The at least one non-transitory computer readable medium of claim 15, wherein:
the first plurality of weights includes a first weight for the first person and a second weight for the second person, the first plurality of weights corresponding to a total population at the first time; and
the second plurality of weights includes a third weight for the first person and a fourth weight for the second person, the second plurality of weights corresponding to the total population at the second time.

17. The at least one non-transitory computer readable medium of claim 16, wherein the first plurality of weights are time-dependent weights corresponding to whether the first audience was exposed to the media at the first time.

18. The at least one non-transitory computer readable medium of claim 15, wherein the instructions cause the one or more processors to:
sum the first weighted exposures to determine a first unique audience total corresponding to the first time; and
sum the second weighted exposures to determine a second unique audience total corresponding to the second time.

* * * * *